US012631524B2

(12) United States Patent
Eichler et al.

(10) Patent No.: US 12,631,524 B2
(45) Date of Patent: May 19, 2026

(54) METHOD FOR TESTING A COMPONENT BASED ON MEASURING PARAMETERS AND CLASSIFYING THE COMPONENT BASED ON THE MEASURED PARAMETERS

(71) Applicant: MTU Aero Engines AG, Munich (DE)

(72) Inventors: Christian Eichler, Munich (DE); Dieter Freno, Munich (DE); Andreas Hieber, Munich (DE); Philipp Farah, Munich (DE); Salome Gassmann, Munich (DE)

(73) Assignee: MTU Aero Engines AG, Munich (DE)

( * ) Notice: Subject to any disclaimer, the term of this patent is extended or adjusted under 35 U.S.C. 154(b) by 342 days.

(21) Appl. No.: 17/595,583

(22) PCT Filed: May 18, 2020

(86) PCT No.: PCT/DE2020/000096
§ 371 (c)(1),
(2) Date: Apr. 25, 2022

(87) PCT Pub. No.: WO2020/239150
PCT Pub. Date: Dec. 3, 2020

(65) Prior Publication Data
US 2023/0194384 A1      Jun. 22, 2023

(30) Foreign Application Priority Data
May 24, 2019      (DE) .......................... 102019207618.1

(51) Int. Cl.
*G01M 15/14*      (2006.01)

(52) U.S. Cl.
CPC .................................. *G01M 15/14* (2013.01)

(58) Field of Classification Search
CPC ....................................................... G01M 15/14
See application file for complete search history.

(56) References Cited

U.S. PATENT DOCUMENTS

| | | | |
|---|---|---|---|
| 6,963,824 B1 | 11/2005 | Davidson et al. | |
| 7,024,263 B2 | 4/2006 | Drake, Jr. et al. | |
| 2006/0129259 A1 | 6/2006 | Tornquist et al. | |
| 2016/0010970 A1* | 1/2016 | Hancock | G01M 1/00 |
| | | | 702/155 |

(Continued)

FOREIGN PATENT DOCUMENTS

| | | |
|---|---|---|
| CH | 430754 A | 2/1967 |
| CN | 201247024 Y | 5/2009 |

(Continued)

*Primary Examiner* — Eric S. McCall
(74) *Attorney, Agent, or Firm* — Hinckley, Allen & Snyder, LLP; David R. Josephs

(57) ABSTRACT

The present invention relates to a method for testing a component, in particular an aircraft engine, comprising the steps of: determining (S40) a value of a first toleranced parameter (A1; A2) of the component; determining (S50) a value of a second toleranced parameter (E1; . . . ; E4) of the component; and classifying (S70) the component in a predefined quality class if this value pair lies outside of a predefined tolerance range, the upper and/or lower limit (G) of which for the second parameter depends on the first parameter, in particular linearly, in at least one first permissible value range (Ta1,1) of the first parameter.

17 Claims, 2 Drawing Sheets

(56)     References Cited

U.S. PATENT DOCUMENTS

| 2016/0054231 A1 | 2/2016 | Hess et al. |
| 2016/0202691 A1 | 7/2016 | Pettersson et al. |
| 2016/0274000 A1 | 9/2016 | Staeding et al. |
| 2017/0248940 A1 | 8/2017 | Regnault |
| 2019/0389137 A1 | 12/2019 | Frohmaier et al. |
| 2022/0024609 A1* | 1/2022 | Hieber .................. G01M 15/14 |

FOREIGN PATENT DOCUMENTS

| CN | 103028962 A | 4/2013 |
| DE | 102014216567 A1 | 2/2016 |
| DE | 102017108534 A1 | 10/2018 |
| EP | 1645924 A1 | 4/2006 |
| EP | 2993541 A1 | 3/2016 |
| EP | 3045992 A1 | 7/2016 |
| EP | 3082004 A2 | 10/2016 |
| WO | 9701802 A1 | 1/1997 |
| WO | 2016046729 A1 | 3/2016 |

* cited by examiner $$a_{c1} \times A1 - e_{c1} \times E1 > c_{11}$$
$$a_{d1} \times A1 - e_{d1} \times E1 < d_{11}$$

METHOD FOR TESTING A COMPONENT BASED ON MEASURING PARAMETERS AND CLASSIFYING THE COMPONENT BASED ON THE MEASURED PARAMETERS

BACKGROUND OF THE INVENTION

Field of the Invention

The present invention relates to a method for testing a component, in particular an aircraft engine, to a method for specifying a tolerance range for this component testing and to a system and a computer program product for performing it.

Discussion of Background Information

In the case of components of aircraft engines, the compliance with required tolerances must be checked in a particularly precise and reliable manner. The present invention can therefore be used particularly advantageously to test aircraft engine components, but without being restricted thereto.

In the case of components, a check has previously been individually carried out, for different specified component parameters, in order to determine whether the value of the corresponding component parameter is within a specified tolerance field, for example an actual dimension exceeds a nominal dimension by at most a specified upper limit dimension and undershoots a nominal dimension by at most a specified lower limit dimension.

If only such an actual value is outside the tolerance field specified for it, the component is rejected. This often results in high reject rates, in particular when testing aircraft engine components.

One object of an embodiment of the present invention is to improve the rates of faulted components, in particular reject rates, during component testing.

SUMMARY OF THE INVENTION

According to one embodiment of the present invention, a method for testing a component, in one preferred embodiment a component for, in particular of, an aircraft engine, has the steps of:

determining a value of a first parameter of the component, for which a (permissible) tolerance is specified ("tolerated parameter");

determining a value of a second tolerated parameter of the component; and classifying the component in a specified quality class, in one embodiment one of two or more specified quality classes, in particular a poorer quality class, if this value pair is outside a specified tolerance range, in one embodiment a closed tolerance range, the upper and/or lower limit of which for the second parameter in at least one first permissible value range of the first parameter depend(s), in one embodiment linearly, on the first parameter.

This is based on the idea that a strong deviation of an actual value of a component parameter from its specified target or nominal value can be compensated for by a (sufficiently) small deviation of an actual value of another component parameter from its specified target or nominal value.

In one embodiment, this makes it possible to reduce the rate of faulted components, in particular the reject rate, and nevertheless advantageously makes it possible to ensure the suitability of the components which have not been faulted.

In one embodiment, a linear dependence can simplify the testing, can increase its reliability and/or can reduce the time needed for this. Accordingly, in one embodiment, this upper and/or lower limit for the second parameter in the first permissible value range of the first parameter is/are or has/have been described by an inequation of the form first coefficient×value of first parameter−second coefficient×value of second parameter≥constant or first coefficient×value of first parameter−second coefficient×value of second parameter>constant or first coefficient×value of first parameter−second coefficient×value of second parameter≤constant or first coefficient×value of first parameter−second coefficient×value of second parameter<constant, where the coefficients may be greater than or less than zero.

In one embodiment, the upper and/or lower limit of the tolerance range for the second parameter in at least one second permissible value range of the first parameter depend(s), in one embodiment linearly, on the first parameter in an opposing or inverse manner to the first permissible value range. If a rising value of the first parameter within the first permissible value range therefore allows an increasing deviation of the second parameter from its target value, the opposing limit allows an increasing deviation of the second parameter from its target value as the value of the first parameter falls within the second permissible value range.

As a result, in one embodiment, a strong deviation of an actual value of a component parameter from its specified target value can be compensated for in both directions in each case by a (sufficiently) small deviation of an actual value of another component parameter from its specified target value and the rate of faulted components, in particular the reject rate, can be reduced (further) as a result. In one embodiment, this upper and/or lower limit for the second parameter in the second permissible value range of the first parameter is/are or has/have been described by an inequation of the form explained above first coefficient×value of first parameter−second coefficient×value of second parameter ≥,>,≤ or <constant.

In one embodiment, the first permissible value range of the first parameter contains a minimum or maximum permissible value of the first parameter. In one development, the first permissible value range of the first parameter contains a minimum permissible value of the first parameter and the second permissible value range of the first parameter contains a maximum permissible value of the first parameter.

As a result, in one embodiment, a strong deviation of an actual value of a component parameter from its specified target value can be compensated for, in particular in both directions in each case, by a small deviation of an actual value of another component parameter from its specified target value, and the rate of faulted components, in particular the reject rate, can be reduced (further) as a result.

In one embodiment, the upper and/or lower limit of the tolerance range for the second parameter in at least one permissible value range of the first parameter, which in the present case is referred to as a further permissible value range of the first parameter without restricting generality, is/are independent of the first parameter, with the result that the second value range explained above may, but need not, be present.

This is based on the idea that excessive deviations of an actual value of a component parameter from its specified target value can no longer be compensated for by small deviations of an actual value of another component parameter from its specified target value.

In one embodiment, the method has the steps of:

determining a value of at least a third tolerated parameter of the component; and classifying the component in the specified quality class if this value is outside a specified third tolerance field.

This is based on the idea of checking, in addition to the first and second component parameters, at least one further component parameter, for which an excessive deviation of its actual value from its specified target or nominal value cannot be compensated for by small deviations of an actual value of another component parameter from its specified target value.

In one embodiment, the method has the step of:

classifying the component in the specified quality class if the value of the first parameter is outside a specified maximum first tolerance field.

Additionally or alternatively, the method has the step of:

classifying the component in the specified quality class if the value of the second parameter is outside a specified maximum second tolerance field.

In one embodiment, the specified tolerance range therefore defines or comprises a specified maximum first tolerance field and/or a specified maximum second tolerance field which must be complied with in any case by the first and/or second component parameter.

In one embodiment, the component is rejected if it is or has been classified in the specified quality class. This makes it possible to reduce the reject rate in one embodiment.

In another embodiment, the component is reworked or is provided, in particular sorted out and/or marked, for this purpose if it is or has been classified in the specified quality class. This makes it possible to reduce the reworking effort in one embodiment.

According to one embodiment of the present invention, the dependence of the upper and/or lower limit of the permissible tolerance field for the second parameter on the first parameter in the first and/or second permissible value range of the first parameter is or has been specified on the basis of a property, in one embodiment a structural-mechanical property, in one embodiment functionality, of the component type of the component, which depends on a combination of the first and second parameters.

This is based on the idea of specifically identifying parameters which, in particular the tolerances of which, influence, in combination with one another or on the basis of one another, such a property of the component (type), and of then specifically specifying corresponding tolerance ranges. Accordingly, in one embodiment, the tolerance of the first parameter and of the second parameter acts on a property, in one embodiment a structural-mechanical property, in one embodiment functionality, of the component type of the component or the permissible tolerance range is or has been specified accordingly.

On account of the installation and operating conditions, the invention can be used particularly advantageously to test rotor blades and guide blades of gas turbines, in particular aircraft engine gas turbines.

In one embodiment, a dimensional tolerance, in particular a dimensional tolerance of a length or a dimensional tolerance of a distance, in one embodiment between two functional surfaces of the component, has been or is specified for the first tolerated parameter.

Additionally or alternatively, a shape tolerance or a positional tolerance, in one embodiment a shape tolerance for an evenness and/or a shape or positional tolerance for one of these (two) functional surfaces, has been or is specified for the second tolerated parameter.

It has surprisingly been found that deviations within dimensional tolerances and deviations within shape or positional tolerances, in particular, can be compensated for by one another; in particular, strong deviations of distances between functional surfaces from their target values can be compensated for by small deviations from a target shape of one of these functional surfaces.

Accordingly, in one embodiment, the first and/or second parameter may (each) have, in particular be or describe or define, a dimension, in particular a length, a distance, in particular a clear width, in particular a diameter, or the like, a shape, in particular a straightness, an evenness, a roundness, a cylindrical shape, a profile shape of a line, a profile shape of a surface or the like, or a position, in particular a location, coaxiality, symmetry, parallelism, perpendicularity, inclination, (overall) concentricity, (overall) axial run-out or the like.

In one embodiment, the specified tolerance range is or has been indicated on a drawing of the component, preferably at least partially, in particular for the upper and/or lower limit for the second parameter in the first and/or second permissible value range of the first parameter, in the form of a function, in particular an inequation.

In one embodiment, this makes it possible to simplify the testing, increase its reliability and/or reduce the time required for this purpose.

In one embodiment, determining a parameter comprises carrying a measurement once or several times.

According to one embodiment of the present invention, a system is configured, in particular in terms of hardware and/or software, in particular in terms of programming, to perform a method described here and/or has:

means for determining a value of a first tolerated parameter of the component;

means for determining a value of a second tolerated parameter of the component; and means for classifying the component in a specified quality class if this value pair is outside a specified tolerance range, the upper and/or lower limit of which for the second parameter in at least one first permissible value range of the first parameter depend(s), in particular linearly, on the first parameter.

A means in the sense of the present invention may be designed using hardware and/or software, in particular may have a processing unit, in particular a digital processing unit, which preferably has a data or signal connection to a storage and/or bus system, in particular a microprocessor unit, in particular at least one CPU, and/or one or more programs or program modules. The processing unit may be designed to execute instructions which are implemented as a program stored in a storage system, to capture input signals from a data bus and/or to emit output signals to a data bus. A storage system may have one or more, in particular different, storage media, in particular optical, magnetic, solid-state and/or other non-volatile media. The program may be such that it embodies or is able to carry out the methods described here, with the result that the processing unit can carry out the steps of such methods and can therefore test the component, in particular. In one embodiment, a computer program product may be, in particular, a storage medium, in particular a non-volatile storage medium, for storing a program or with a program stored thereon, wherein execution of this program causes a system or a controller, in particular a computer, to carry out a method described here or one or more of its steps.

In one embodiment, one or more, in particular all, steps of the method are performed in a fully or partially automated manner, in particular by the system or its means.

BRIEF DESCRIPTION OF THE DRAWINGS

Further advantageous developments of the present invention emerge from the subclaims and the following description of preferred embodiments. In this respect, in a partially schematic manner:

DETAILED DESCRIPTION OF EXEMPLARY EMBODIMENTS OF THE INVENTION

Figure 2:
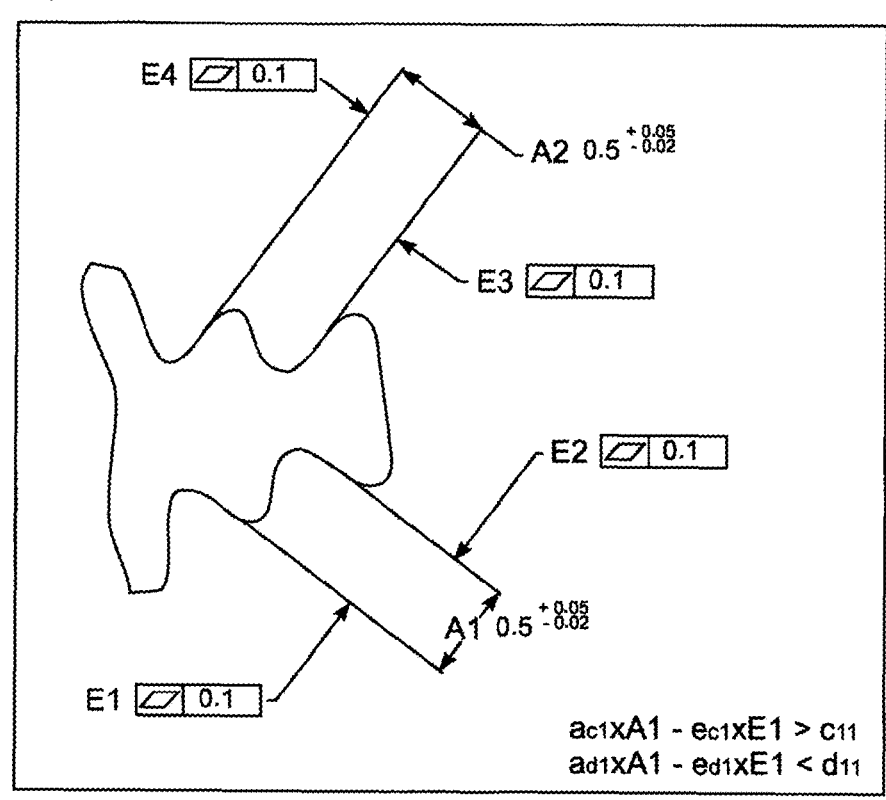
FIG. 2 shows an excerpt of a component drawing used in the method.

FIG. 2 shows an excerpt of a component drawing for a blade having a fir-tree-like blade root for fastening the blade in a corresponding groove of a rotor or housing of a gas turbine.

The distances $A1$, $A2$ between functional surfaces of the blade root are tolerated and each form a first tolerated parameter of this component.

In addition, the evennesses or planarities $E1, \ldots, E4$ of these functional surfaces are tolerated and each form a second tolerated parameter of this component. In this case, the value of the corresponding evenness indicates, in a manner conventional in the art, the permissible plane distance between two parallel surfaces which define a gap-shaped tolerance zone between them in which the functional surface is intended to be located.

In a first step S10 (cf. FIG. 1), tolerances are specified for these component parameters and possibly further component parameters.

A second step S20 checks, for combinations of these component parameters, whether a strong deviation of the actual value of a parameter from its target or nominal dimension can be compensated for by a sufficiently small deviation of the actual value of the other parameter from its target or nominal dimension. Such combinations can be identified by the structural mechanics, for example, and appropriate dependences can be specified in each case therefor.

For such combinations (S20: "Y"), the combinations (A1, E1), (A1, E2), (A2, E3) and (A2, E4) in the exemplary embodiment, a corresponding tolerance range is specified in each case in a step S25, but not for the other combinations (S20: "N"), for example (A1, E3).

Figure 3:
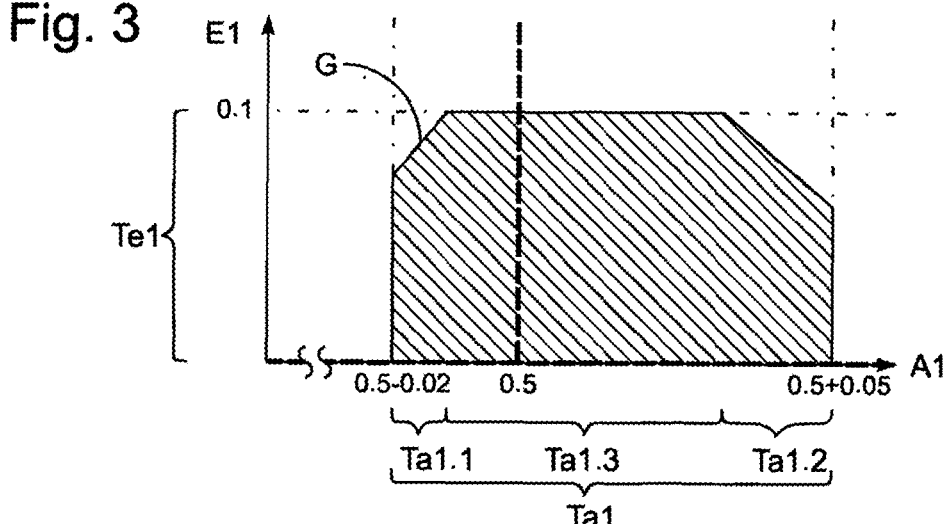
FIG. 3 shows a specified tolerance range used in the method.

FIG. 3 shows, by way of example, the specified tolerance range for the first tolerated component parameter $A1$ and the second tolerated component parameter $E1$: the target or nominal dimensions for the two parameters are depicted using bold dashed lines and the maximum tolerance fields $Ta1$, $Te1$ for the two parameters are depicted using thin dash-dotted lines.

By virtue of the inequation indicated in the component drawing $$a_{c1} \times A1 - e_{c1} \times E1 > c_{11}$$

the upper limit G for the second parameter in a first permissible value range $Ta1,1$ of the first parameter, which contains the minimum permissible value 0.48 of the first parameter, depends linearly on the first parameter.

In a similar manner, the upper limit G for the second parameter in a second permissible value range $Ta1,2$ of the first parameter, which contains the maximum permissible value 0.55 of the first parameter, depends linearly on the first parameter, in an opposing manner, by virtue of the inequation indicated in the component drawing $$a_{d1} \times A1 - e_{d1} \times E1 < d_{11}.$$

In the further permissible value range $Ta1,3$ of the first parameter in between, the upper limit of the tolerance range for the second parameter is independent of the first parameter.

In a step S30, the corresponding inequations are indicated, together with the maximum permissible tolerance fields of the parameters $A1, \ldots, E4$, on the component drawing, as indicated in FIG. 2 for the maximum permissible tolerance fields of the parameters $A1, \ldots, E4$ and the above-described tolerance range for the combination (A1, E1).

In a step S40, the values of the first parameters $A1$, $A2$ are now measured for a specific component, and the values of the second parameters $E1, \ldots, E4$ are determined in a step S50 by means of measurement.

A step S60 then (in each case) checks whether the corresponding value pair for one of the (as yet unchecked) combinations, for which a tolerance range is specified, is outside the specified tolerance range.

Figure 1:
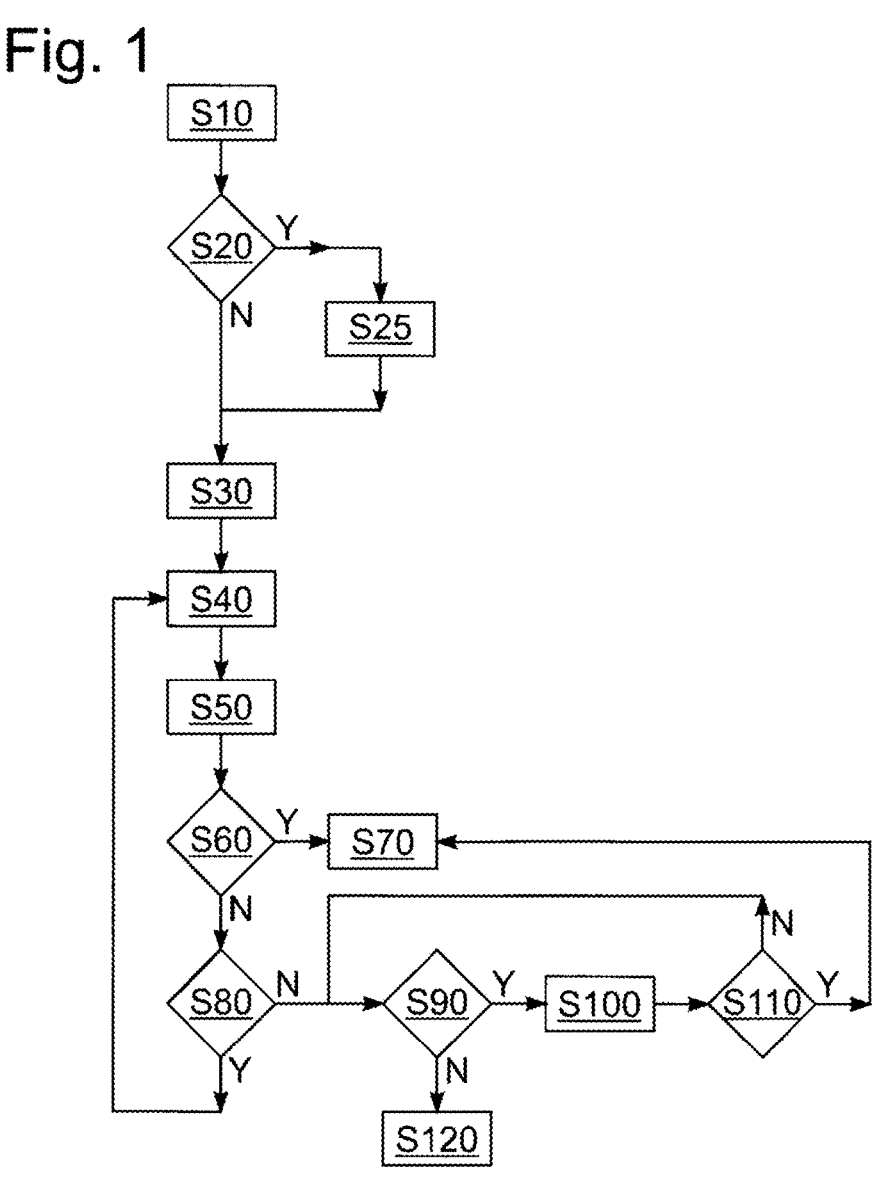
FIG. 1 shows a method according to one embodiment of the present invention.

If this is the case (S60: "Y"), the component is classified as a reject (FIG. 1: step S70).

Otherwise (S60: "N"), a check is carried out in order to determine whether a common tolerance range has been specified for further (as yet unchecked) combinations. If this is the case (S80: "Y"), step S60 is carried out again for these combinations.

Otherwise (S80: "N"), a check is carried out in order to determine whether a tolerance field which has not yet been checked has been specified for at least one third parameter.

If this is the case (S90: "Y"), the corresponding value is measured (S100) and a check is carried out in order to determine whether it is outside this specified tolerance field.

If this is the case (S110: "Y"), the component is likewise classified as a reject (S70).

Otherwise (S110: "N"), step S90 is carried out again.

If it is determined in said step that a tolerance field has not been specified for any (further or previously unchecked) third parameter (S90: "N"), the testing is ended (S120).

Figure 4:
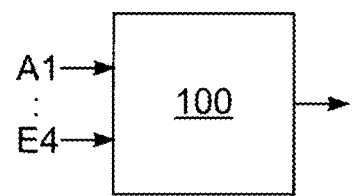
FIG. 4 shows a system for performing the method.

FIG. 4 shows a system for performing the method described above in an at least partially automated manner in the form of a computer 100 which is configured to classify the component as a reject or as good on the basis of input values for the first and second and possibly third parameters.

Although exemplary embodiments have been explained in the description above, it should be pointed out that a multiplicity of modifications are possible. In addition, it should be pointed out that the exemplary embodiments are merely examples which are not intended to restrict the scope of protection, the applications and the structure in any way. Rather, the description above provides a person skilled in the art with a guideline for implementing at least one exemplary embodiment, wherein various changes, in particular with regard to the function and arrangement of the component parts described, can be made without departing from the scope of protection as is clear from the claims and equivalent combinations of features.

LIST OF REFERENCE SIGNS

100 Computer (system)
A1, A2 Distance between functional surfaces (first parameter)
E1, . . . , E4 Evenness of a functional surface (second parameter)
G Upper limit
Ta1 Maximum first tolerance field
Ta1,1 First permissible value range of the first parameter
Ta1,2 Second permissible value range of the first parameter
Ta1,3 Further permissible value range of the first parameter
Te1 Maximum second tolerance field

What is claimed is:

1. A method for testing a component, wherein the method comprises the steps of:
   measuring a value of a first tolerated parameter of the component;
   measuring a value of a second tolerated parameter of the component; and
   classifying the component in a specified quality class if the value pair is outside a specified tolerance range;
   the upper and/or lower limit of the specified tolerance range depending on the first parameter and the second parameter;
   using the component as a component for a gas turbine and installing it in the gas turbine if the value pair is not outside the specified tolerance range.

2. The method of claim 1, wherein an upper and/or lower limit of the tolerance range for the second parameter in at least one second permissible value range of the first parameter depend linearly on the first parameter to a first permissible value range.

3. The method of claim 1, wherein a first permissible value range of the first parameter contains a minimum or maximum permissible value of the first parameter.

4. The method of claim 1, wherein an upper and/or lower limit of the tolerance range for the second parameter is independent of the first parameter.

5. The method of claim 1, wherein the method further comprises the steps of:
   determining a value of at least a third tolerated parameter of the component; and
   classifying the component in the quality class if the values of a first tolerated parameter, the second tolerated parameter and a third tolerated parameter are outside a specified tolerance range.

6. The method of claim 1, wherein the component is an aircraft engine.

7. A system for testing a component which is configured to perform a method according to claim 1 and comprises:
   components for measuring a value of a first tolerated parameter of the component;
   components for measuring a value of a second tolerated parameter of the component; and
   components for classifying the component in a specified quality class if this value pair is outside a specified tolerance range,
   the upper and/or lower limit of a specified tolerance range for the second parameter depending on the first parameter in at least one first permissible value range of the first parameter.

8. A computer program product, wherein the product comprises a program code for performing at least a part of the method according to claim 1, stored on a computer-readable medium.

9. The method of claim 1, wherein an upper and/or lower limit of the tolerance range for the second parameter depends linearly on the first parameter in an at least one first permissible value range of the first parameter.

10. The method of claim 9, wherein the specified tolerance range is indicated on a drawing of the component.

11. The method of claim 1, wherein an upper and/or lower limit of the tolerance range for the second parameter in at least one second permissible value range of the first parameter depend on the first parameter to a first permissible value range.

12. The method of claim 11, wherein a first permissible value range of the first parameter contains a minimum permissible value of the first parameter and the second permissible value range of the first parameter contains a maximum permissible value of the first parameter.

13. The method of claim 1, wherein the component is a rotor blade or guide blade of a gas turbine and/or a dimensional tolerance is specified for the first parameter and/or a shape or positional tolerance for functional surfaces is specified for the second parameter.

14. The method of claim 13, wherein a length or a distance is specified for the first parameter and/or an unevenness of functional surfaces is specified for the second parameter.

15. The method of claim 1, wherein the tolerance range is specified on the basis of a property of the component type which depends on a combination of the first and second parameters.

16. The method of claim 15, wherein the property of the component type is a structural-mechanical property.

17. The method of claim 15, wherein the property of the component type is a functionality.

\* \* \* \* \*